US005704058A

United States Patent [19]
Derrick et al.

[11] Patent Number: 5,704,058
[45] Date of Patent: Dec. 30, 1997

[54] CACHE BUS SNOOP PROTOCOL FOR OPTIMIZED MULTIPROCESSOR COMPUTER SYSTEM

[76] Inventors: John E. Derrick, 14 Hunting Ridge La., Milton, Vt. 05468; Christopher M. Herring, P.O. Box 7673, Longmont, Colo. 80501

[21] Appl. No.: 426,503

[22] Filed: Apr. 21, 1995

[51] Int. Cl.$^6$ .............................. G06F 12/00; G06F 13/38
[52] U.S. Cl. .......................... 395/495; 395/496; 395/287
[58] Field of Search ........................ 395/468, 473, 395/481, 494, 495, 496, 287

[56] References Cited

U.S. PATENT DOCUMENTS

| | | | |
|---|---|---|---|
| 5,202,973 | 4/1993 | Ramanujan et al. | 395/474 |
| 5,255,374 | 10/1993 | Aldereguia et al. | 395/293 |
| 5,261,106 | 11/1993 | Lentz et al. | 395/726 |
| 5,293,603 | 3/1994 | MacWilliams et al. | 395/309 |
| 5,325,503 | 6/1994 | Stevens et al. | 395/473 |
| 5,335,335 | 8/1994 | Jackson et al. | 395/448 |
| 5,339,399 | 8/1994 | Lee et al. | 395/473 |
| 5,341,487 | 8/1994 | Derwin et al. | 395/473 |
| 5,355,467 | 10/1994 | MacWilliams et al. | 395/473 |
| 5,475,829 | 12/1995 | Thome | 395/479 |
| 5,524,235 | 6/1996 | Larson et al. | 395/478 |

*Primary Examiner*—David L. Robertson
*Attorney, Agent, or Firm*—Schmeiser, Olsen & Watts

[57] ABSTRACT

A cache bus snoop protocol optimizes performance of a multiprocessor computer system with multiple level two caches by allocating windows of cache bus snoop activity on a need basis. When a cycle to cacheable address space is requested, the cache bus is granted only after the necessary snoop and write-back cycles are completed. During the snoop and write-back cycles, snoop activity by other devices in inhibited.

3 Claims, 3 Drawing Sheets

CACHE BUS SNOOP PROTOCOL FOR OPTIMIZED MULTIPROCESSOR COMPUTER SYSTEM

BACKGROUND OF THE INVENTION

1. Technical Field

This invention generally relates to cache memory subsystems in computer systems, and more specifically relates to a method for optimizing memory bus bandwidth in a multiprocessor computer by implementing a cache bus snoop protocol which allocates windows of cache bus snoop activity on a need basis.

2. Background Art

The first computers had one processor that sequentially executed a series of instructions to perform certain functions or to solve a problem. More recently, attention has focused on multiprocessing systems, where several processors all work on different tasks or different portions of the same task concurrently, thereby greatly increasing the computing performance of the system. One way to increase the performance of a system is to provide high speed cache memory for each processor. The presence of multiple caches, however, creates an issue of cache coherency, ie., assuring that identical data in each cache and in system memory is modified or invalidated to reflect the most recent change to the data.

Systems with multiple levels of cache are known with various schemes to assure cache coherency. One such system is disclosed in U.S. Pat. No. 5,325,503, "Cache Memory System Which Snoops an Operation to a First Location in a Cache Line and Does Not Snoop Further Operations to Locations in the Same Line" (issued June 1994 to Stevens et al. and assigned to Compaq Computer Corp.), which is incorporated herein by reference. Once a cache has snooped to a cache line, subsequent accesses to locations within that line are not snooped, improving system performance by not performing needless snoops.

Other systems for assuring cache coherency in a multiprocessor system are also known. For example, U.S. Pat. No. 5,335,335, "Multiprocessor Cache Snoop Access Protocol Wherein Snoop Means Performs Snooping Operations after Host Bus Cycle Completion and Delays Subsequent Host Bus Cycles until Snooping Operations Are Completed" (issued August 1994 to Jackson et al. and assigned to Compaq Computer Corp.) discloses a method and apparatus for guaranteeing snoop access to all host (cache) bus cycles which require snooping, and is incorporated herein by reference. The Description of the Prior Art in Jackson et al. sets forth many of the issues relating to cache coherehey in a multiple cache, multiprocessor systems. Jackson et al. provide latches in the cache controller that latch the bus state of any host bus snoop cycles that it cannot immediately process to allow for processing the snoop at a later time. It also provides a signal which delays the completion of the subsequent host bus cycle until the previously latched host bus cycle can be snooped by the cache subsystem.

In a multiprocessor computer system, system memory is shared by the processors and by devices coupled to a typical expansion bus, such as a PCI bus. Therefore a scheme is required to allocate memory bus bandwidth to the processors and to the devices coupled to the expansion bus. One method is to interleave processor and expansion bus traffic on the cache bus cycle by cycle. This method, however, requires additional cache bus bandwidth and reduces the hit rate of the cache subsystems, resulting in lower system performance. Greater performance may be obtained by disallowing interleaving of expansion bus and processor accesses to the cache bus, reducing the required cache bus bandwidth, which allows for a higher hit rate in the cache subsystems. One way to provide for optimized memory bus bandwidth is to grant control either to a processor or to the expansion bus device, which retains control until arbitration relinquishes the cache bus to the other. This results in a potential deadlock condition that can occur when a miss at a level two cache (L2) causes a snoop hit in another L2 cache just prior to the bus being relinquished to a snoop of the cache bus due to an expansion bus transfer. The first snoop (L2 to L2) requires a write-back to occur, and the second snoop (expansion bus) requires a write-back to occur. However, the expansion bus write-back cannot occur until the L2 write-back occurs, but the L2 cache that needs to perform the write-back no longer has control of the cache bus. The write-backs are thus out of order, resulting in deadlock.

Therefore, there existed a need to enhance the performance of a multiprocessor, multiple cache computer system by providing a cache bus snoop protocol that optimizes cache bus bandwidth without resulting in deadlock.

DISCLOSURE OF INVENTION

According to the present invention, a multiprocessor computer system with multiple level two cache subsystems optimizes cache bus bandwidth by providing a protocol for selectively granting control of the cache bus to one of the devices that require access to the cache bus, such as a level two cache or a device coupled to an expansion bus. When a device needs access to the cache bus, it issues a request for the cache bus. If the access requires snoop activity, a back off signal is given, if required, until the necessary snoop and write back cycles are completed. The back off signal indicates to the requesting device that the cache bus is busy, and to try again later. If no snoop activity is required for the requested access, control of the cache bus is relinquished to the requesting device.

The foregoing and other objects, features and advantages of the invention will be apparent from the following more particular description of a preferred embodiment of the invention, as illustrated in the accompanying drawings.

BRIEF DESCRIPTION OF DRAWINGS

The preferred exemplary embodiment of the present invention will hereinafter be described in conjunction with the appended drawings, where like designations denote like elements, and.

BEST MODE FOR CARRYING OUT THE INVENTION

Figure 1:
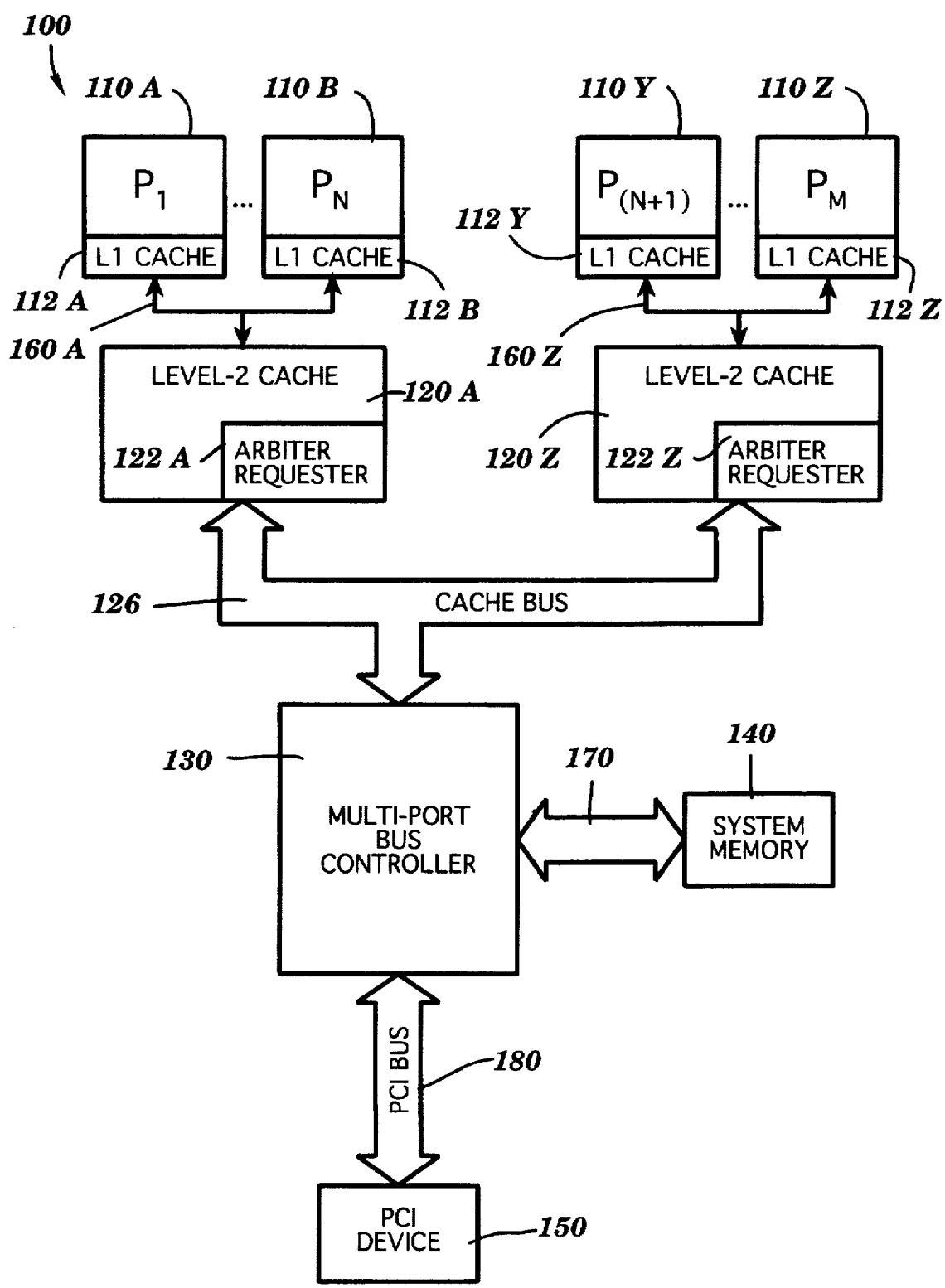
FIG. 1 is a block diagram of a multiprocessor computer system with multiple level two caches and a multi-port bus controller which share a common cache bus.

Referring to FIG. 1, a multiprocessor computer system 100 has multiple processors 110A–110Z; multiple second level (L2) dual-port caches 120A–120Z; a multi-port bus controller 130; system memory 140; an expansion bus device 150; local busses 160A–160Z; a common cache bus 126; a memory bus 170; and an expansion bus 180. A first port of each L2 cache 120 is coupled to one or more processors 110 via a local bus 160. Cache bus 126 interconnects the second port of all L2 caches 120A–120Z and one port of multi-port bus controller 130. A second port of multi-port bus controller 130 is coupled via memory bus 170 to system memory 140, and a third port of multi-port bus controller 130 is coupled via expansion bus 180 to expansion bus device 150.

Multi-port bus controller 130 includes arbitration logic for selectively granting control of cache bus 126 to one of L2 caches 120A–120Z or to expansion bus device 150, thereby allocating windows of cache bus snoop activity on a need basis. When a cycle request to cacheable address space is made, the cycle is delayed until the L2 caches can be snooped. During the snooping of the L2 caches, snoop cycles by other devices requesting control of cache bus 126 are inhibited. The arbitration scheme implemented in the arbitration logic results in an efficient allocation of cache bus bandwidth that optimizes system performance.

Processors 110A–110Z are suitably microprocessors used in known microcomputer systems, such as the Intel Pentium® microprocessors, or may be other types of processors as the particular application requires. Processors 110A–110Z suitably include corresponding internal first level caches 112A–112Z. Each processor 110 is coupled to a corresponding local bus 160, which is coupled to an L2 cache 120 that services processor 110.

L2 caches 120A–120Z are high speed (ie., no wait state) dual port memories external to processors 110A–110Z which store instructions and/or data for the respective processors. One port of each L2 cache 120A–120Z is coupled to the processors serviced by that L2 cache via local busses 160A–160Z. The remaining ports of each L2 cache 120A–120Z are coupled together via cache bus 126, which is also coupled to one port of multi-port bus controller 130. To maximize system performance and to optimize memory bus bandwidth in a system with multiple L2 caches 120A–120Z, each L2 cache must have the capability to snoop the other caches to determine whether the required data is contained in any other L2 cache. In addition, memory bus bandwidth can be further optimized by allowing expansion bus devices 150 to also snoop L2 caches 120A–120Z. Allowing snooping by both L2 caches and expansion bus devices 150 requires a protocol for efficiently allocating windows of cache bus activity for snooping L2 caches 120A–120Z.

Multi-port bus controller 130 is suitably a chip or chipset with multiple ports which controls all exchanges between devices coupled to the various ports. Multi-port bus controller 130 as shown in FIG. 1 has one port coupled via cache bus 126 to L2 caches 120A–120Z, has a second port coupled via memory bus 170 to system memory 140, and has a third port coupled via PCI bus 180 to one or more PCI devices 150. Thus, multi-port bus controller 130 in FIG. 1 controls all exchanges between processors 110A–110Z, system memory 140, and expansion bus devices 150.

Memory bus 170 comprises any suitable bus configuration for transferring information to and from system memory 140. Expansion bus 180 suitably comprises a typical expansion bus in a microcomputer system, such as PCI®, Micro-Channel®, ISA, and EISA. Expansion bus device 150 suitably comprises any peripheral device that may be coupled to expansion bus 180. For example, as shown in FIG. 1, expansion bus 180 may be a PCI bus, and expansion bus device 150 may be a PCI device.

Figure 2:
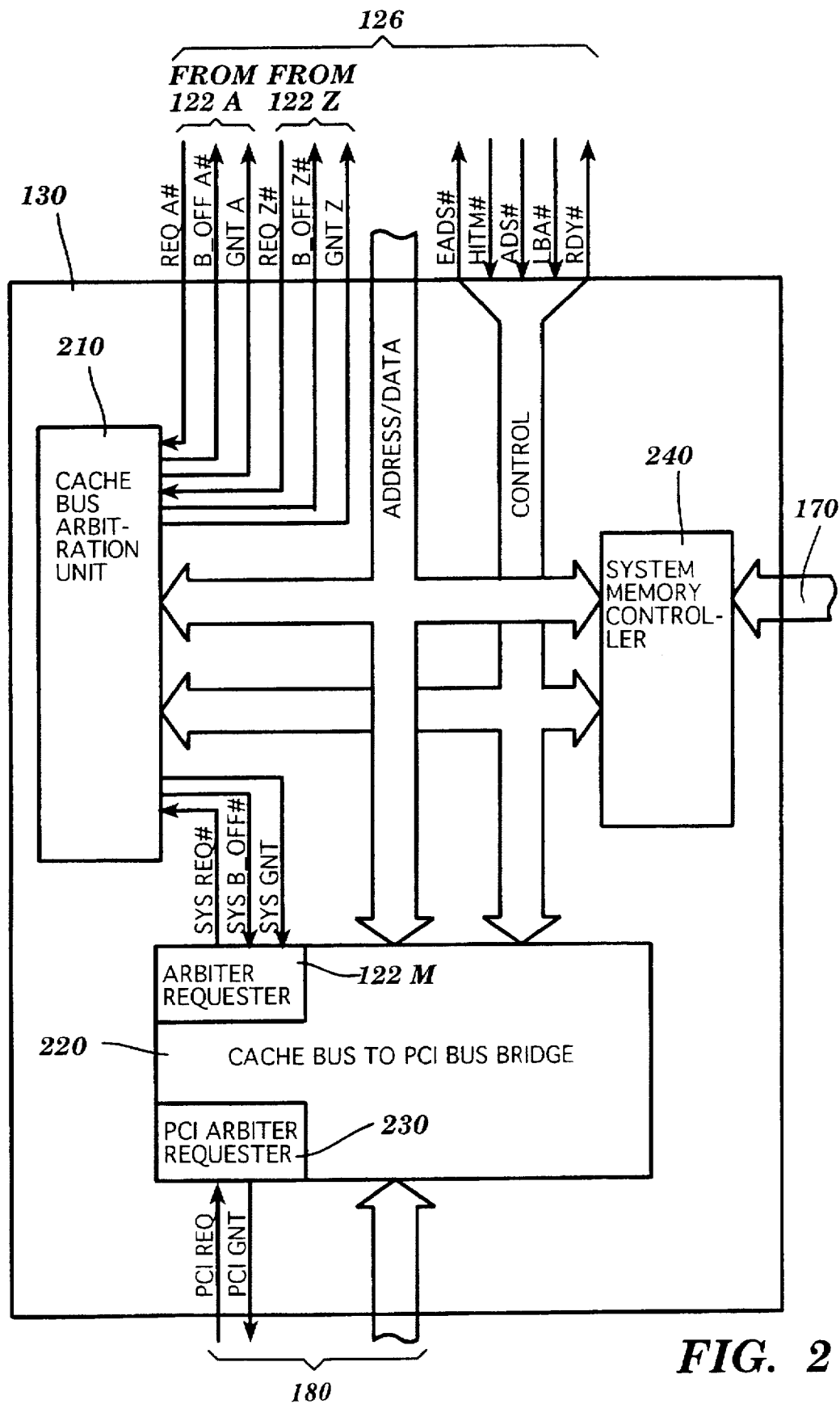
FIG. 2 is a block diagram of the multi-port bus controller of FIG. 1.

Referring now to FIG. 2, multi-port bus controller 130 of FIG. 1 includes a cache bus arbitration unit 210; a cache bus to PCI bus bridge 220; and a system memory controller 240. Cache bus to PCI bus bridge 220 performs all exchanges between cache bus 126 and PCI bus 180, and includes an arbiter requester 122M that is used to communicate with cache bus arbitration unit 210, and a PCI arbiter requester 230 that is used to communicate with PCI device 150 over PCI bus 180. Cache bus arbitration unit 210 dictates which transfers are given access to cache bus 126. System memory controller 240 controls accesses to system memory 140 via memory bus 170.

When a device such as expansion bus device 150 or one of processors 110A–110Z needs to perform a cycle to a selected address, snooping on cache bus 126 is required if the address is to cacheable address space. If the address is to non-cacheable address space, the access can occur without snooping cache bus 126, and processor and expansion bus device access can continue on cache bus 126 without waiting for a snoop cycle. However, if the cycle requires a snoop, the snoop cycle must be performed on cache bus 126 prior to allowing other accesses. The protocol in accordance with the present invention allocates cache bus 126 to the requesting device requiring snoop activity while inhibiting snoop activity by other devices until the necessary snoop and write-back cycles can be completed.

System memory space is generally cacheable. Thus, when an access to system memory is required by any of the L2 caches 120A–120Z or by PCI device 150, the device requiring the transfer must acquire control of cache bus 126 to perform the snoop. In accordance with the protocol of the present invention, cache bus arbitration unit 210 allocates windows of cache bus snoop activity on a need basis in a manner that maximizes cache bus bandwidth without creating a deadlock condition.

Figure 3:
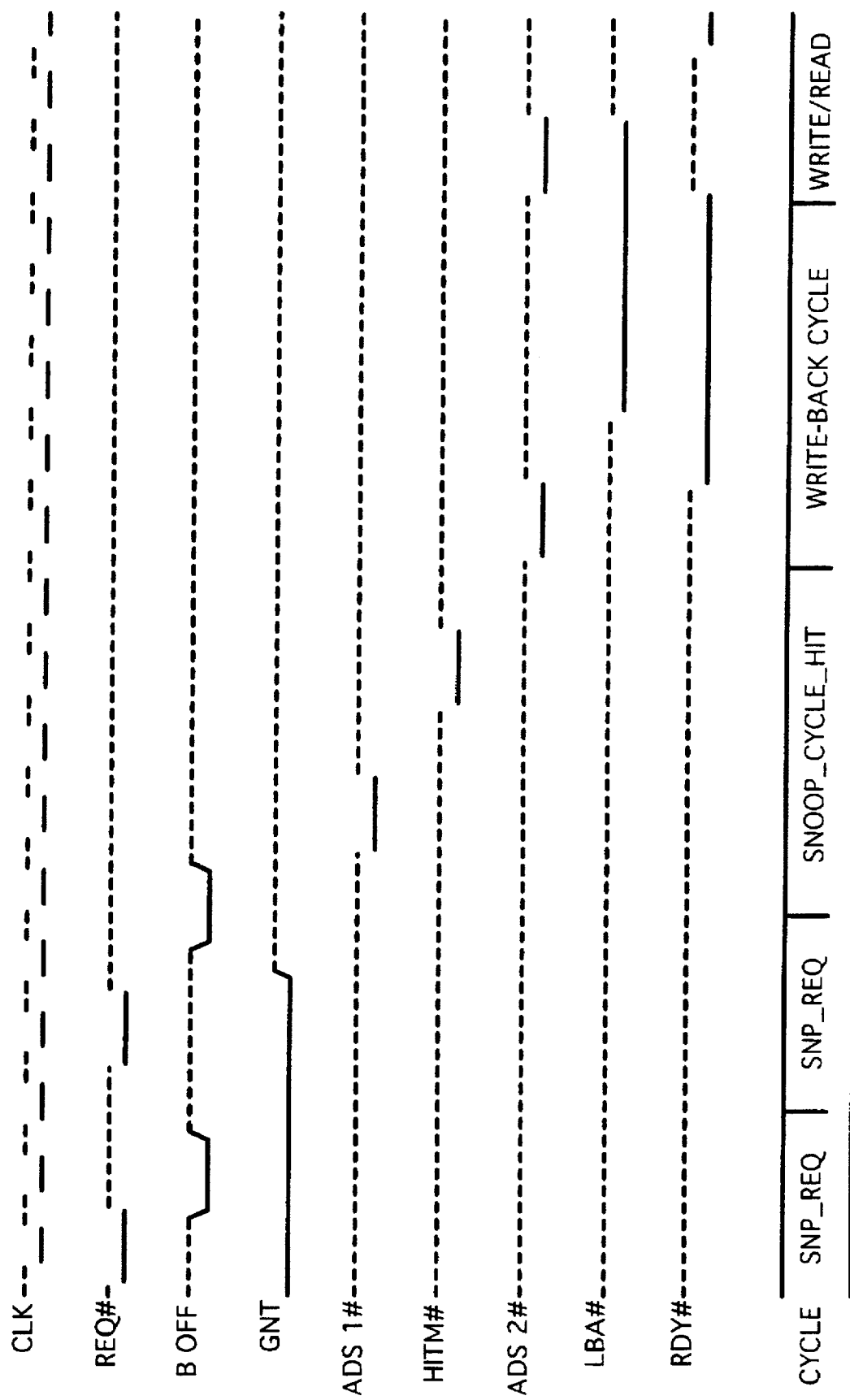
FIG. 3 is a timing diagram showing the protocol in accordance with the present invention.

The scheme used by cache bus arbitration unit 210 to allocate cache bus 126 to requesting devices can best be understood in reference to the timing diagram of FIG. 3. CLK is the system clock signal; REQ# corresponds to a signal asserted by a device requesting a cycle on the cache bus; $B_{13}$ OFF corresponds to a signal asserted by cache bus arbitration unit 210 to tell the requesting device to back off when a device needs to snoop the cache bus 126; GNT corresponds to a signal asserted by cache bus arbitration unit 210 granting control of cache bus 126 to the requesting device; ADS1# corresponds to a signal asserted by the requesting device which strobes the address of the snoop cycle on cache bus 126; HITM# corresponds to a signal asserted by a cache to signal a "hit" during the snoop cycle; ADS2# corresponds to the address strobe of the cache that signaled "hit" to strobe the address of a subsequent write-back cycle; LBA# is a signal driven by the caches to indicate the write-back cycle is targeted to system memory; and RDY# is asserted by system memory controller 240 to strobe in data from the write-back cycle. The various types of bus cycles are indicated on the CYCLE line of FIG. 3.

When a device needs to access cacheable address space, resulting in snoop activity on cache bus 126, the device asserts a request line REQ# to cache bus arbitration unit 210. If cache bus 126 is currently busy and cannot grant the request, cache bus arbitration unit 210 does not assert GNT#. The back off signal tells all requesting devices that cache bus 126 is currently unavailable when a snoop cycle is in progress on cache bus 126. The assertion of back off causes the requesting device to cancel its cycle and to drive its cache bus interface to a high impedance state. In addition, back off requires the requesting device to request the bus again at a later time, preferably on the next clock cycle. Cache bus arbitration unit 210 does not assert GNT# in response to assertions of REQ# from the requesting device until cache bus 126 is available, which occurs after any pending snoop cycle completes its write-back cycle to system memory.

Once cache bus 126 is available, and the requesting device has asserted its request line REQ#, cache bus arbitration unit 210 asserts a grant signal GNT to indicate to the requesting device that control of cache bus 126 has been granted. Once the requesting device has control of cache bus 126, it can perform its snoop cycle to determine whether the data it needs to access exists in one of the L2 caches. The requesting device performs the snoop cycle by driving its backoff signal $B_{13}$ OFF and then driving the address of the access on the address bus, and driving an address strobe signal, corresponding to ADSI# in FIG. 3. The assertion of ADS1# tells the L2 caches that they are being snooped, and if one of the L2 caches has the accessed data, it responds with a HITM# signal to indicate a cache hit during the snoop cycle, and drives the cache data onto cache bus 126. If the requesting device is performing a read operation, the required data is strobed into the requesting device by CLK when HITM# is low, completing the read cycle. If the requesting device is performing a write operation, however, the L2 cache containing the data (ie., the L2 that asserted HITM#) must write back the cache line containing the data to system memory 140 prior to the write by the requesting device to system memory 140 to assure cache coherency. Therefore, during a write cycle, the L2 cache that contains the cache line that includes the data to be written performs a write-back cycle by asserting an address strobe signal ADS2# while driving the dirty cache line onto cache bus 126. LBA# is driven low by the L2 cache driving the cache line onto cache bus 126 to indicate that the cycle is intended for system memory. In response, system memory controller 240 drives the ready signal RDY# low and strobes the cache line data from cache bus 126 in bursts using CLK when RDY# is low. System memory controller 240 then writes the cache line over memory bus 170 into a buffer (not shown) or into system memory 140. Once the dirty cache line has been written back to the buffer or system memory 140, the device that requested a write to that cache line can interact with system memory controller 240 to write the data to system memory 140.

The protocol in accordance with the present invention may be illustrated using a specific example of when a PCI device requests a cacheable cycle on cache bus 126. Referring to FIG. 2, when PCI device 150 needs to access a cacheable address, such as system memory, it asserts a PCI REQ# signal on PCI bus 180 that is coupled to PCI arbiter/requester 230 within cache bus to PCI bus bridge 220. The assertion of PCI REQ# on PCI arbiter requester 230 causes arbiter requester 122M to assert its SYS REQ# output to cache bus arbitration unit 210. The SYS REQ# signal corresponds to REQ# in FIG. 3. In response to receiving the request, cache bus arbitration unit 210 asserts SYS GNT (GNT in FIG. 3) to allocate cache bus 126 to PCI device 150 if the cache bus is not busy. Once cache bus arbitration unit 210 allocates cache bus 126 to PCI device 150 by asserting SYS GNT, cache bus to PCI bus bridge 220 snoops the current PCI cycle to cache bus 126 by asserting SYS BOFF, writing the address of the access on the address bus, and strobing an external address strobe line EADS#, which corresponds to ADS1# in FIG. 3. Each L2 cache 120A–120Z checks to see if it contains a valid copy of the data at the address of the snoop, and if one of the L2 caches finds a valid copy, it asserts HITM#, indicating a cache hit for the PCI snoop cycle, and strobes the data on subsequent CLK edges when HITM# is low out to PCI bus bridge 220. If the PCI cycle is a read cycle, the data strobed into bridge 220 is posted to PCI device 150 on PCI bus 180, and the cycle is completed. If the PCI cycle is a write, the L2 cache that indicated a hit with HITM# must write back its dirty cache line into system memory 140 prior to PCI device 150 writing its data, to assure cache coherency. The write-back cycle is performed as shown in FIG. 3. Following the write-back cycle, PCI device 150 writes its data into system memory 140 by way of system memory controller 240.

While the description above specifically illustrates the protocol for a PCI cycle, the same protocol applies for L2 caches 120A–120Z that require access to cache bus 126. For example, when cache 120A needs to access cache bus 126, it asserts REQA# to cache bus arbitration unit 210, which responds with the appropriate $B_{13}$ OFFA# or $GNT_{13}$ A signals. Likewise, when cache 120Z needs to access cache bus 126, it asserts REQZ# to cache bus arbitration unit 210, which responds with the appropriate $B_{13}$ OFFZ# or $GNT_{13}$ Z signals.

Cache to cache snooping in a multiprocessor system 100 is relatively straightforward, and various known methods exist to perform the snoops. However, the addition of expansion bus devices 150 on an expansion bus 180 complicates the system, and optimizing system performance requires a method of interleaving expansion bus and L2 snoop traffic on cache bus 126. The cache bus protocol in accordance with the present invention provides a straightforward approach to optimizing performance of a multiprocessor system with multiple L2 caches by allocating windows of cache bus snoop activity on a need basis.

While the invention has been particularly shown and described with reference to a preferred exemplary embodiment thereof, it will be understood by those skilled in the art that various changes in form and details may be made therein without departing from the spirit and scope of the invention. For example, it will be understood that, while various of the conductors or connections are shown in the drawing as single lines, they are not so shown in a limiting sense, and may comprise plural conductors or connections, as is understood in the art.

We claim:

1. A method of allocating windows of cache bus bandwidth for cache to cache and system snoop activity on a need basis to minimize impact on performance while maximizing memory page hit accesses comprising the steps of:

providing an address space having cacheable and non-cacheable portions;

providing a cycle request for access to a selected address within the address space;

determining from the selected address if the cycle request requires snoop activity by determining whether the selected address is in the cacheable address space;

allowing local bus and expansion bus activity to occur on the cache bus if the cycle request is for non-cacheable address space not requiring snoop activity; and delaying the cycle request if snoop activity is required until it can be determined that the necessary snoop and write-back cycles can be completed.

2. The method of claim 1 further including the step of inhibiting other devices from performing snoop cycles during the necessary snoop and write-back cycles.

3. The method of claim 2 wherein the step of inhibiting other devices from performing snoop cycles comprises the step of providing a back off signal to the other devices that request a cycle during the necessary snoop and write-back cycles.

* * * * *